(12) United States Patent
Hirata et al.

(10) Patent No.: US 8,171,126 B2
(45) Date of Patent: May 1, 2012

(54) STORAGE NETWORK SYSTEM, MANAGING APPARATUS, MANAGING METHOD AND PROGRAM

(75) Inventors: Toshiaki Hirata, Kashiwa (JP); Motoaki Hirabayashi, Yokohama (JP)

(73) Assignee: Hitachi, Ltd., Tokyo (JP)

(*) Notice: Subject to any disclaimer, the term of this patent is extended or adjusted under 35 U.S.C. 154(b) by 0 days.

(21) Appl. No.: 13/275,612

(22) Filed: Oct. 18, 2011

(65) Prior Publication Data
US 2012/0036258 A1    Feb. 9, 2012

Related U.S. Application Data

(63) Continuation of application No. 13/157,034, filed on Jun. 9, 2011, now Pat. No. 8,082,338, which is a continuation of application No. 12/554,285, filed on Sep. 4, 2009, now Pat. No. 7,987,256, which is a continuation of application No. 12/216,471, filed on Jul. 7, 2008, now Pat. No. 7,610,369, which is a continuation of application No. 11/395,309, filed on Apr. 3, 2006, now Pat. No. 7,412,506, which is a continuation of application No. 11/196,441, filed on Aug. 4, 2005, now Pat. No. 7,412,504, which is a continuation of application No. 10/424,883, filed on Apr. 28, 2003, now Pat. No. 7,093,011.

(30) Foreign Application Priority Data

Aug. 1, 2002 (JP) .................................. 2002-224323

(51) Int. Cl.
*G06F 15/173* (2006.01)
(52) U.S. Cl. ........ 709/223; 709/224; 709/227; 370/389; 370/498

(58) Field of Classification Search .................. 709/223, 709/224, 227; 370/389, 396, 397, 498; 710/36, 710/38, 46; 711/114
See application file for complete search history.

(56) References Cited

U.S. PATENT DOCUMENTS
5,257,367 A    10/1993 Goodlander et al.
(Continued)

FOREIGN PATENT DOCUMENTS
JP    09055795    2/1997
(Continued)

OTHER PUBLICATIONS

Masaru Kitsuregawa, "Storage Networking", vol. 2, Examples of Storage Networking, EMC Japan Co., Ltd., Storage Networking Industry Association, Jul. 1, 2002, Japan.

(Continued)

*Primary Examiner* — Lashonda Jacobs
(74) *Attorney, Agent, or Firm* — Mattingly & Malur, PC

(57) ABSTRACT

A management computer includes a memory storing toplogical information including identifiers of ports of computers, storage apparatuses, and switches. The management computer includes a processor, which is configured to: collect a plurality of performance information of the ports, and a plurality of access times from computer ports to the storage apparatuses; evaluate that a certain access time among the plurality of access times exceeds a predetermined allowable range; search a first access path to which the certain access time corresponds; search at least one second access path starting from a first computer port on the first access path; and search performance information of certain ports which are on the at least one second access path in order to display the searched performance information.

18 Claims, 12 Drawing Sheets

U.S. PATENT DOCUMENTS

| | | | |
|---|---|---|---|
| 5,257,374 A | 10/1993 | Hammer et al. | |
| 5,515,376 A | 5/1996 | Murthy et al. | |
| 5,973,690 A | 10/1999 | Ofer et al. | |
| 6,009,466 A | 12/1999 | Axberg et al. | |
| 6,041,042 A | 3/2000 | Bussiere | |
| 6,105,122 A | 8/2000 | Muller et al. | |
| 6,229,538 B1 | 5/2001 | McIntyre et al. | |
| 6,233,236 B1 | 5/2001 | Nelson et al. | |
| 6,233,246 B1 | 5/2001 | Hareski et al. | |
| 6,289,398 B1 | 9/2001 | Stallmo et al. | |
| 6,297,823 B1 | 10/2001 | Bharali et al. | |
| 6,339,789 B1 | 1/2002 | Sugauchi et al. | |
| 6,381,642 B1 | 4/2002 | O'Donnell et al. | |
| 6,434,613 B1 * | 8/2002 | Bertram et al. | 709/223 |
| 6,483,839 B1 | 11/2002 | Gemar et al. | |
| 6,516,348 B1 | 2/2003 | MacFarlane et al. | |
| 6,545,982 B1 | 4/2003 | Murthy et al. | |
| 6,553,419 B1 | 4/2003 | Ram | |
| 6,557,035 B1 | 4/2003 | McKnight | |
| 6,584,499 B1 | 6/2003 | Jantz et al. | |
| 6,658,457 B2 * | 12/2003 | Nishikawa et al. | 709/206 |
| 6,664,978 B1 | 12/2003 | Kekic et al. | |
| 6,704,316 B1 | 3/2004 | He | |
| 6,721,862 B2 | 4/2004 | Grant et al. | |
| 6,763,380 B1 | 7/2004 | Mayton et al. | |
| 6,772,207 B1 | 8/2004 | Dorn et al. | |
| 6,839,852 B1 | 1/2005 | Pantuso et al. | |
| 6,845,344 B1 | 1/2005 | Lally et al. | |
| 6,851,020 B2 | 2/2005 | Matsumoto et al. | |
| 6,944,654 B1 | 9/2005 | Murphy et al. | |
| 7,051,182 B2 | 5/2006 | Blumenau et al. | |
| 7,093,011 B2 * | 8/2006 | Hirata et al. | 709/223 |
| 7,219,300 B2 | 5/2007 | Arquie et al. | |
| 7,342,891 B2 | 3/2008 | Chen et al. | |
| 7,412,504 B2 * | 8/2008 | Hirata et al. | 709/223 |
| 7,412,506 B2 * | 8/2008 | Hirata et al. | 709/223 |
| 7,519,046 B2 * | 4/2009 | Suzuki et al. | 370/351 |
| 7,554,910 B2 * | 6/2009 | Iwata et al. | 370/231 |
| 2002/0065938 A1 | 5/2002 | Jungck et al. | |
| 2002/0069245 A1 | 6/2002 | Kim | |
| 2002/0071398 A1 | 6/2002 | Moran et al. | |
| 2002/0107974 A1 | 8/2002 | Janoska et al. | |
| 2002/0152305 A1 | 10/2002 | Jackson et al. | |
| 2002/0156887 A1 | 10/2002 | Hashimoto | |
| 2002/0161978 A1 * | 10/2002 | Apostol et al. | 711/151 |
| 2002/0167955 A1 | 11/2002 | Shimojo | |
| 2003/0016686 A1 | 1/2003 | Wynne et al. | |
| 2003/0055946 A1 | 3/2003 | Amemiya | |
| 2003/0105976 A1 | 6/2003 | Copeland | |
| 2003/0135612 A1 | 7/2003 | Huntington et al. | |
| 2003/0187945 A1 | 10/2003 | Lubbers et al. | |
| 2003/0189929 A1 | 10/2003 | Matsuzakai et al. | |
| 2003/0212785 A1 | 11/2003 | Jibbe | |
| 2003/0214962 A1 | 11/2003 | Allaye-Chan et al. | |
| 2003/0225876 A1 * | 12/2003 | Oliver et al. | 709/224 |
| 2004/0059822 A1 | 3/2004 | Jiang et al. | |
| 2004/0128380 A1 | 7/2004 | Chen et al. | |
| 2004/0257999 A1 * | 12/2004 | MacIsaac | 370/252 |
| 2005/0039132 A1 | 2/2005 | Germain et al. | |
| 2005/0108444 A1 | 5/2005 | Flauaus et al. | |
| 2005/0271052 A1 * | 12/2005 | Tang et al. | 370/389 |
| 2006/0215552 A1 * | 9/2006 | Iwata et al. | 370/229 |
| 2007/0016681 A1 * | 1/2007 | Suzuki et al. | 709/227 |
| 2007/0055797 A1 | 3/2007 | Shimozono | |
| 2009/0144466 A1 | 6/2009 | Takayama et al. | |

FOREIGN PATENT DOCUMENTS

| | | |
|---|---|---|
| JP | 2000259702 | 9/2000 |
| JP | 2001-51890 | 2/2001 |

OTHER PUBLICATIONS

Hseih, J. et al, "Performance of a Mass Storage System for Video-On-Demand", Journal of Parallel and Distributed Computing, Nov. 1995, vol. 30, pp. 147-167.

Chen, J. et al, "A Cascading Neural-Net for Traffic Management of Computer Networks", ACM Annual Computer Science Conference, 1993, pp. 272-277.

vander Merwe, J. et al, "mmdump: A Tool for Monitoring Internet Multimedia Traffic", ACM SIGCOMM Computer Communication Review, Oct. 2000, vol. 30, Issue 5, pp. 48-59.

Jacobson, D. et al, "A Distributed Measurement Technique for an Operating Ethernet Network", (abstract only), ACM Annual Computer Science Conf., St. Louis, MO, 2000, p. 458.

SAN Navigator Version 2.0, Storage/LDAP/Sun Blade 100/Solaris, Sun World, vol. 11, No. 7, Jul. 1, 2001, p. 135 (with English translation).

* cited by examiner

Fig. 12 (a)

| Node ID | Node Type | Port ID | Port ID at Destination |
|---|---|---|---|
| Computer A | Computer | CA1 | SA1 |
| Computer B | Computer | CA2 | SB1 |
| Switch A | Switch | SA1 | CA1 |
| Switch A | Switch | SA2 | STA1 |
| Switch B | Switch | SB1 | CA2 |
| Switch B | Switch | SB2 | STA1 |
| Switch B | Switch | SB3 | STB1 |
| Storage App. A | Storage Apparatus | STA1 | SA2,SB2 |
| Storage App. A | Storage Apparatus | STA2 | SC2 |
|  |  |  |  |

| Node ID | Port ID | Port Utility Rate (%) |
|---|---|---|
| Computer A | CA2 | 30 |
| Computer B | CB1 | 60 |
| Switch B | SB1 | 30 |
| Switch B | SB2 | 20 |
| Switch B | SC3 | 10 |
| Switch C | SC2 | 45 |
| Storage App. A | STA1 | 25 |
| Storage App. B | STB1 | 10 |
|  |  |  |

| Node ID | Port ID | Physical Disk | Volume |
|---|---|---|---|
| Storage App. A | STA1 | A1,A2 | Volume 1 |
| Storage App. A | STA2 | A1,A2 | Volume 2 |
|  |  |  |  |

1203

STORAGE NETWORK SYSTEM, MANAGING APPARATUS, MANAGING METHOD AND PROGRAM

The present application is a continuation application of U.S. Ser. No. 13/157,034, filed Jun. 9, 2011 (now U.S. Pat. No. 8,082,338), which is a continuation application of U.S. Ser. No. 12/554,285, filed Sep. 4, 2009 (now U.S. Pat. No. 7,987,256), which is a continuation application of U.S. Ser. No. 12/216,471, filed Jul. 7, 2008 (now U.S. Pat. No. 7,610,369), which is a continuation application of U.S. Ser. No. 11/395,309, filed Apr. 3, 2006 (now U.S. Pat. No. 7,412,506), which is a continuation application of Ser. No. 11/196,441, filed Aug. 4, 2005 (now U.S. Pat. No. 7,412,504), which is a continuation of application Ser. No. 10/424,883, filed Apr. 28, 2003 (now U.S. Pat. No. 7,093,011), which claim priority to JP 2002-224323, filed Aug. 1, 2002, the contents of all of which are incorporated herein by reference.

BACKGROUND OF THE INVENTION

The present invention relates to a storage managing system, and more particularly to a storage managing system that has a function to assist in identifying bottleneck sections in a storage system.

RELATED BACKGROUND ART

A conventional storage managing system is capable of indicating connection relations among devices in storage system on a management monitor screen. Also, the storage managing system is capable of displaying the data traffic amount of each of the devices displayed on the management monitor screen in the unit of connection] ports or in the unit of individual devices.

The aforementioned conventional storage managing system does not display on the management monitor screen the data traffic amount of each of the devices in terms of connection relation among the devices in the storage system. Accordingly, when a bottleneck section in the storage system is to be specified, an administrator initially needs to select ports to be referred to on the management monitor screen that displays the connection relations among the devices, and then refer to the data traffic amount of each of the connection ports of the devices on the storage system to locate the bottleneck section. For this reason, it needs an excessively long time and much work for the administrator to specify the bottleneck section.

After having specified the bottleneck in the storage system, the administrator first needs to refer to the management monitor screen that indicates the connection relations among the devices, then refer to the data traffic amount of each of the connection ports of the devices on the storage system, judges himself a new path to be selected to solve the bottleneck, and execute a path switching processing.

SUMMARY OF THE INVENTION

The present invention relates to assisting network administrators in specifying bottleneck sections occurred in a storage system.

The present invention also relate to assisting network administrators in switching paths to solve bottleneck sections in a storage system.

An embodiment of the present invention pertains to a storage network system that includes at least a computer, a storage system, a connection device that controls a connection relation between the computer and the storage system, and a managing device that manages the computer, the storage system and the connection device. The storage network system, and more preferably the managing device may have a control section that specify connection ports of the computer, the storage system and the connection device that compose the storage network system. Further, the control device of the managing device may display on a display section a data traffic amount at each connection port for each connection path from the connection port in the computer to the connection port in the storage system.

In the storage network system in accordance with the embodiment described above, the control section of the managing device may preferably measure the access time from the computer to each of the connection ports of the connection device and/or the storage system and the data traffic amount at each of the connection ports, specify any of the connection ports at which the access time and the data traffic amount are synchronized with each other, and display the data traffic amount of the specified connection port on the display section in a manner distinguishable from the other connection ports.

Furthermore, in accordance with another embodiment of the present invention, the control section of the managing device may preferably measure the access time for each connection path from the connection port in the computer to the connection port in the storage system, and specify connection ports in the computer, the storage system and the connection device on a specified one of the connection paths when the access time on the specified connection path exceeds a specified allowable time range. Also, the control section of the managing device may preferably display the data traffic amount for each of the connection ports on the display section.

In the embodiment described above, when the data traffic amount for any of the connection ports displayed on the display section exceeds a predetermined reference value, the control section of the managing device may preferably judge that the connection port is overloaded, and display on the display section that the connection port is overloaded.

In accordance with another embodiment of the present invention, the control section of the managing device may preferably specify the computer, the storage system or the connection device that compose the storage network system, and display on the display section the data traffic amount for each connection path from the computer to the storage system for each of the computer, the storage system and the connection device.

In accordance with the embodiment described above, the control section of the managing device may preferably judge that the computer, the storage system or the connection device is overloaded when the data traffic amount for each of the computer, the storage system or the connection device displayed on the display section exceeds a predetermined reference value, and may preferably indicate on the display section that the computer, the storage system or the connection device is overloaded.

Furthermore, the control section of the managing device may preferably specify another connection path that is shared by the connection port that is determined to be overloaded, and display on the display section the data traffic amount for each connection port on the other connection path.

Moreover, the control section of the managing device may preferably specify another connection path that is shared by the storage system or the connection device that is determined to be overloaded, and display on the display section the data traffic amount of the computer, the storage system or the connection device on the other connection path.

Also, in the embodiment described above, a connection path between at least two connection devices or a connection path between at least a computer and a storage system may preferably be shared by an access path to a plurality of computers and a plurality of storage systems.

Further, in the embodiment described above, the control section of the managing device may preferably judge, when the data traffic amount at a connection port of the connection device displayed on the display section exceeds a specified reference value, that the connection device is overloaded, generate a control signal for switching paths to eliminate the overload according to the data traffic amount for each connection port, and transmit the control signal through an interface to the connection device or the storage system that composes the storage network system.

Also, in the embodiment described above, the control section of the managing device may preferably judge, when the data traffic amount at a connection port of the storage system displayed on the display section exceeds a specified reference value, that the storage system is overloaded, generate a copy control signal for copying data stored in the storage system onto another storage system to eliminate the overload according to the data traffic amount for each connection port, and transmit the copy control signal through an interface to the storage system or the connection device.

Moreover, the control section of the managing device may preferably generate an access control signal for switching the access from the storage system that is determined to be overloaded to the other storage system that stores the copied data, and transmit the access control signal through an interface to the connection device and the storage system or the connection device.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

FIGS. 12 (a), 12 (b) and 12 (c) show tables of data structures in a managing information database.

DESCRIPTION OF THE PREFERRED EMBODIMENTS

Figure 1:
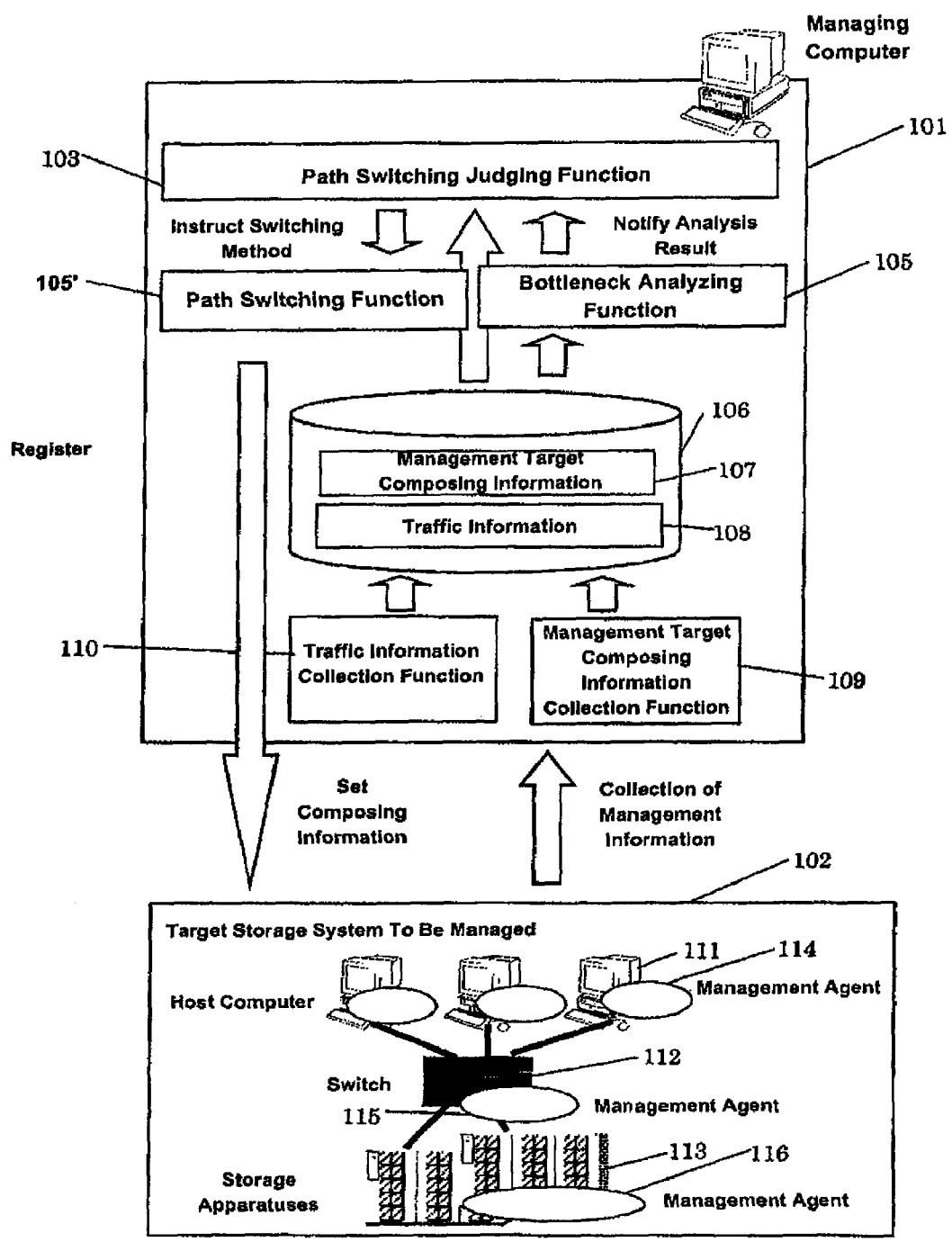
FIG. 1 schematically shows a system structure of a storage managing system.

FIG. 1 shows a system structure of a storage network system in accordance with an embodiment of the present invention.

As indicated in FIG. 1, in the storage network system in accordance with the present embodiment, a managing computer (101) collects management information from a storage system (102) to be managed, and conducts a storage management of the management information. The managing computer (101) also provides setting instructions including switching of access paths to equipments that are to be managed. The managing computer (101) may be composed of a management target composing information collection function (109) that collects information concerning attribute information of each device and connection relation among devices from a target system to be managed, a traffic information collection function (110) that collects information of data traffic amount of each connection port of each equipment, a managing information database 106 that stores and manages the collected management target composing information and traffic information, a bottleneck analyzing function (105) that searches a performance bottleneck section based on the management information, a path switching judging function (103) that sets an appropriate switching method for leveling off the load for the bottleneck section, and a path switching function (105') that instructs target equipments to be managed to switch the paths. The target storage system to be managed is equipped with management agents (114), (115) and (116) at corresponding equipments. Each of the management agents at each equipment responds to requests from the managing computer (101) with management information designated by the managing computer (101) and executes changes of compositions as instructed by the managing computer (101).

Figure 2:
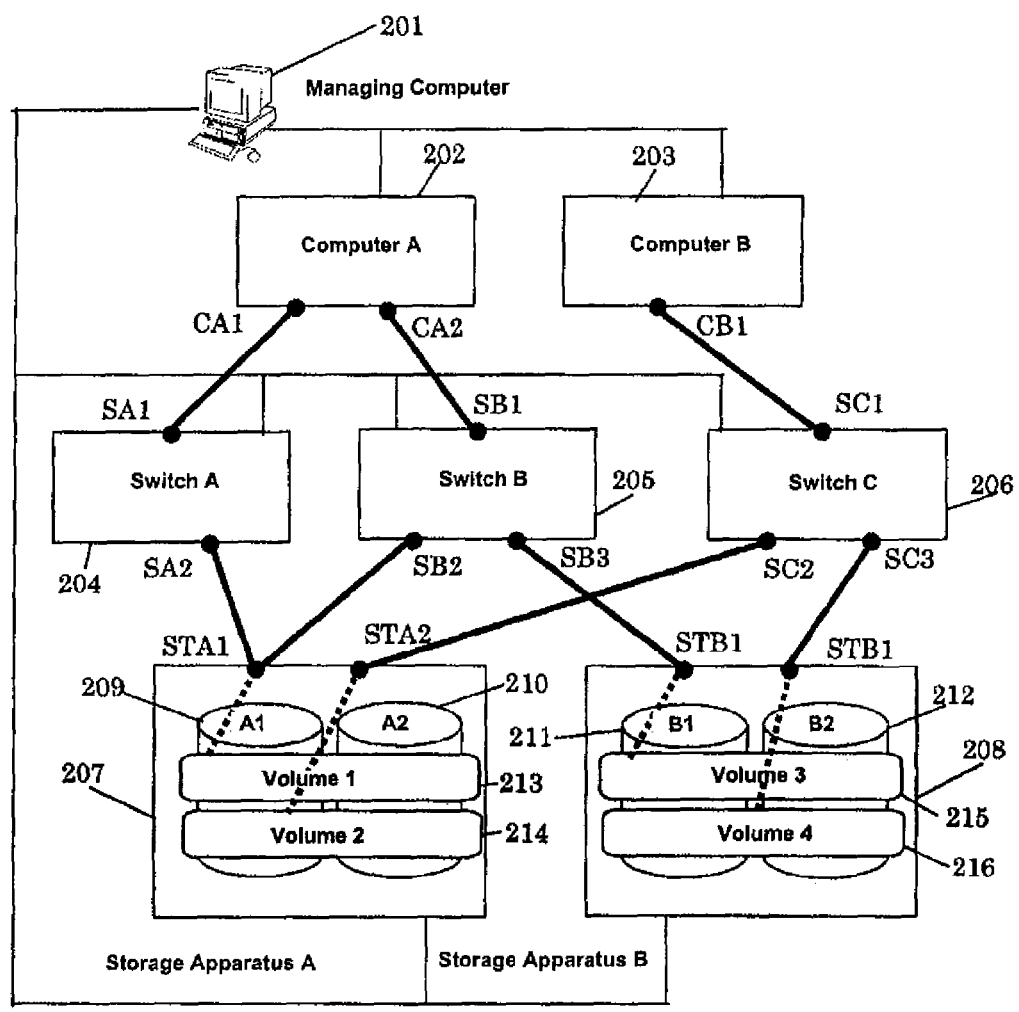
FIG. 2 schematically shows a structure of a storage system.

FIG. 2 shows a system composition of the managing computer (201) and a target storage system to be managed in accordance with one embodiment of the present invention. It is noted that the number of equipments such as computers, switches and the like shown in the drawing may not necessarily limited to those shown in the drawing. The managing computer (201) connects to a computer A (202) and a computer B (203). The computer A (202) includes access ports CA1 and CA2 for accessing to storage apparatuses, and the computer B (203) includes an access port CB1 for accessing to storage apparatuses. A switch A (204) includes an access port SA1 from the computer A, and an access port SA2 to a storage apparatus A (207). A switch B (205) includes an access port SB1 from the computer A, an access port SB2 to the storage apparatus A and an access port SB3 to a storage apparatus B (208). A switch C (206) includes an access port SC1, an access port SC2 to the storage apparatus A and an access port SC3 to the storage apparatus B. The storage apparatus A (207) includes an access port STA1 from the switch A and the switch B, an access port STA2 from the switch C. The storage apparatus B (208) includes an access port STB1 from the switch B and an access port STB2 from the switch C. The storage apparatus A is composed of physical disks A1 (209) and A2 (210), which are assigned volume 1 (213) and volume 2 (214), respectively, that are logical access units as viewed from the computers. The volume 1 (213) and volume 2 (214) are correlated with the access ports STA1 and STA2, respectively. Similarly, the storage apparatus B is composed of physical disks B1 (211) and B2 (212), which are assigned volume 3 (215) and volume 4 (216), respectively, that are logical access units as viewed from the computers. The physical disks B1 (211) and B2 (212) are correlated with the access ports STB1 and STB2, respectively. By the structure described above, accesses can be made from the port CA1 of the computer A through the switch A to the volume I on the storage apparatus A; and accesses can be made from the port CA2 of the computer A through the switch B to the volume 1 on the storage apparatus A and through the switch B to the volume 3 on the storage apparatus B. Also, accesses can be made from the port CB1 of the computer B through the switch C to the volume 2 on the storage apparatus A and through the switch C to the volume 4 on the storage apparatus B. The managing computer has communication paths that enable direct communication to all of the equipments. The communication paths are structured such that management information can be collected from equipments in the system and composition settings can be made to the equipments through the communication paths.

Figure 3:
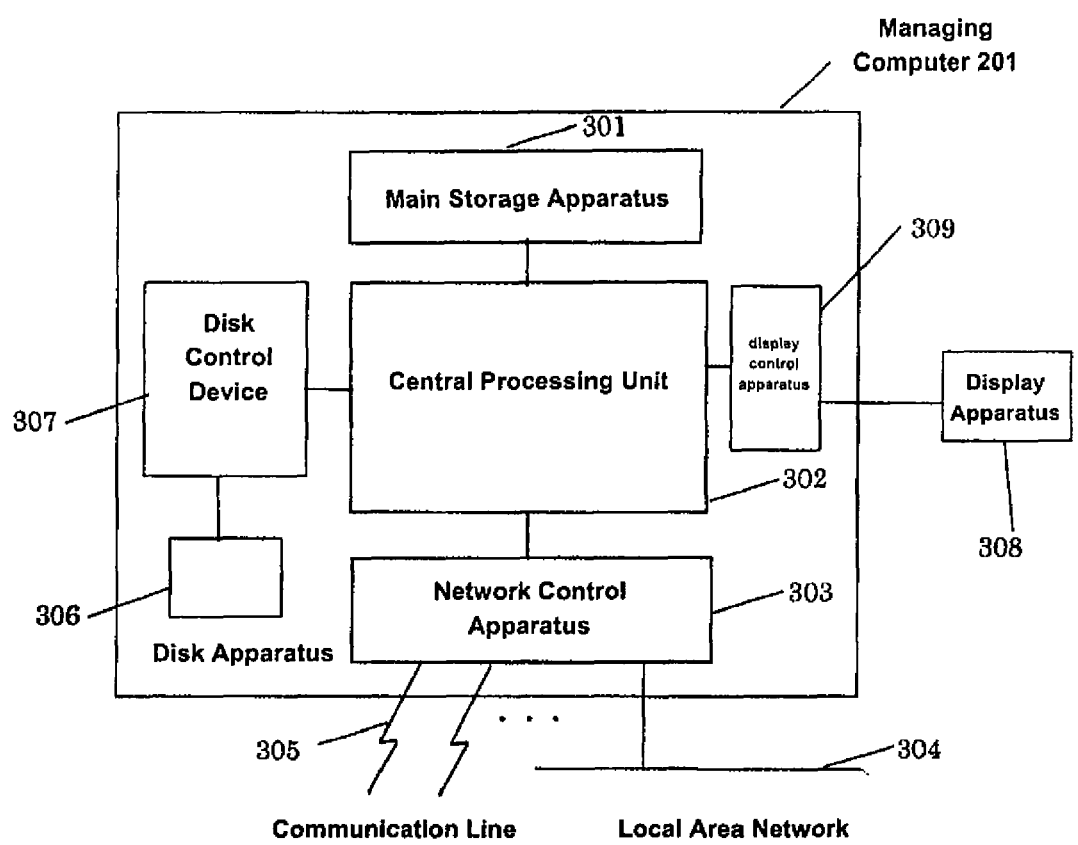
FIG. 3 schematically shows a hardware structure of each computer.

FIG. 3 shows a structure of the managing computer in accordance with an embodiment of the present invention.

The managing computer (201), which may be composed of a computer, is equipped with a central processing unit (302) that executes commands such as operations, a main storage apparatus (301) that stores data necessary for the operations, a network control apparatus (303) that controls input/output of data with a communication line (305) and a local area network (304), a display apparatus (308), and a display control apparatus (309) that controls input/output of data to be displayed by the display apparatus (308).

The central processing unit (302) executes programs loaded on the main storage apparatus (301). Programs that are loaded on the main storage apparatus (301) may be stored in a disk recording apparatus (306) in advance, loaded on the main storage apparatus (301) as necessary, and executed by the central processing unit (302). Alternatively, a portably type storage medium not shown in the drawings, such as, for example, a CD-ROM may be used to store the programs. The programs stored on the storage medium may be read out by a disk recording media reading device that may be portable, which is omitted from the drawings, directly loaded on the main storage apparatus (301) as necessary, and executed by the central processing unit (302). Or, the programs stored on the storage medium may be read out by the disk recording media reading device, installed on the disk recording apparatus (306), loaded on the main storage apparatus (301) as necessary, and executed by the central processing unit (302).

Figure 4:
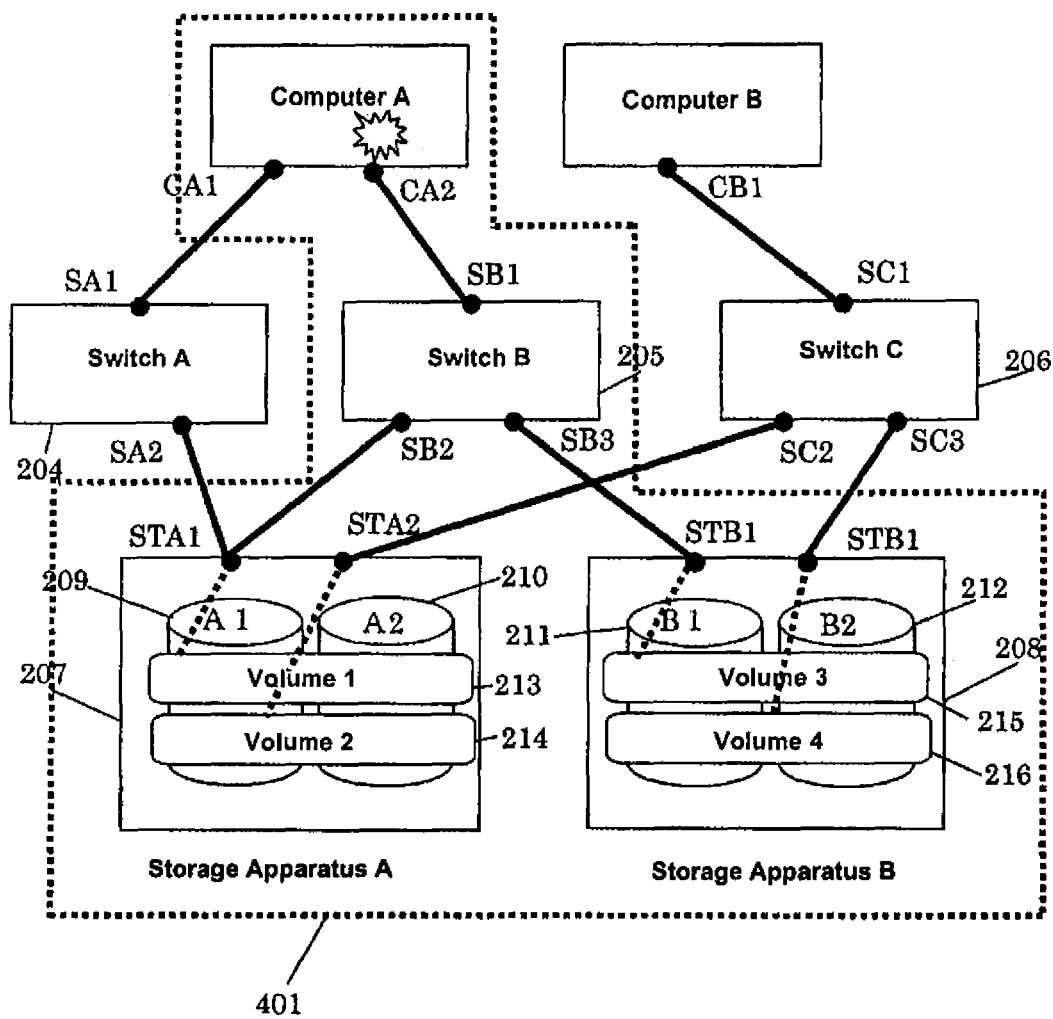
FIG. 4 shows a networking concept of a storage managing system.
Figure 6:
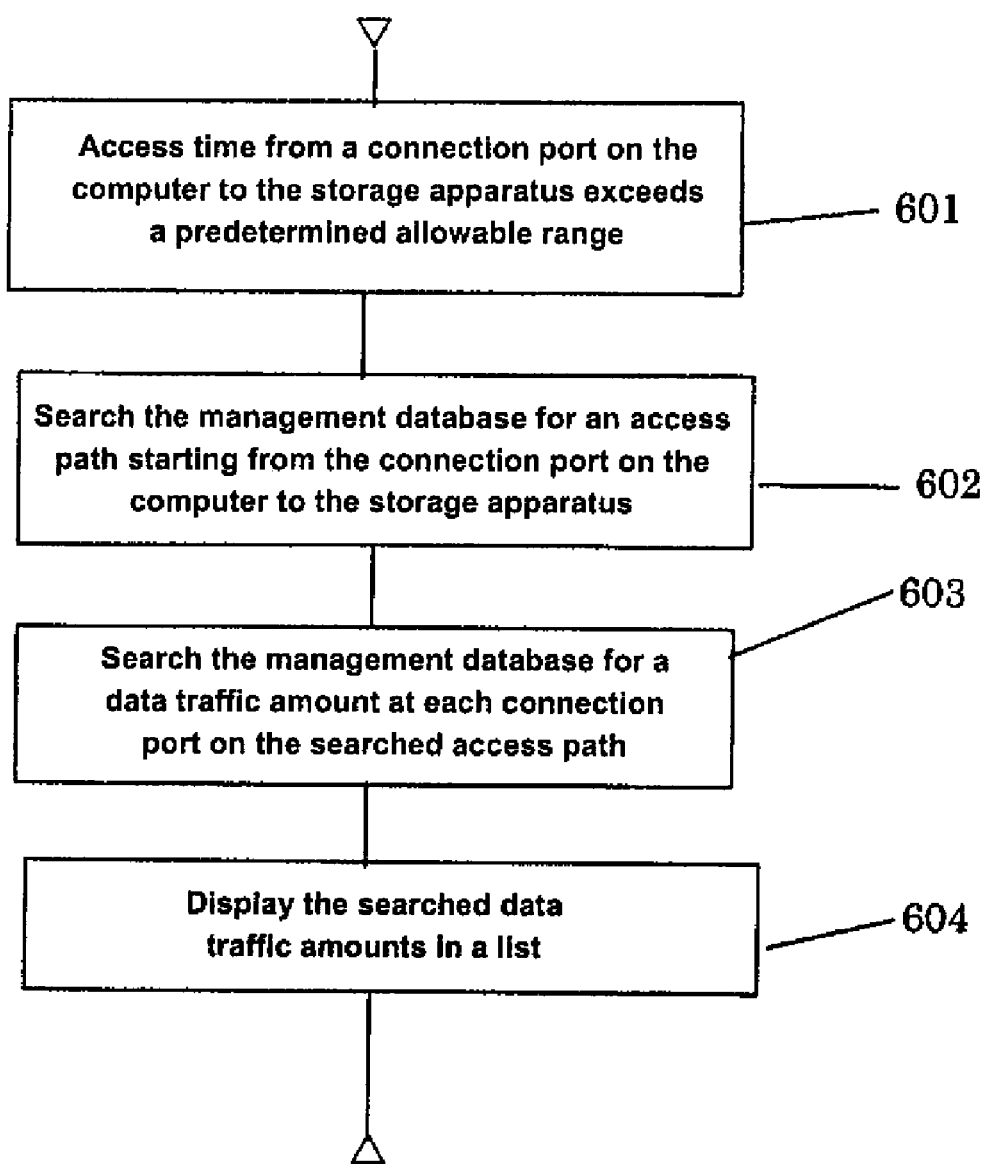
FIG. 6 shows a flowchart of a procedure to search a bottleneck section.

Referring to FIGS. 4 and 6, an analysis procedure performed by the bottleneck analyzing function of the managing computer is described below.

The procedure starts with an event (601) in which, at the port CA2 of the computer A, the access time to the storage apparatuses exceeds a predetermined allowable range. Here, connection ports that can be accessed from the port CA2 at this moment include the ports SB1, SB2 and SB3 of the switch B, the port STA1 of the storage apparatus A, and the port STB 1 of the storage apparatus B (which corresponds to an area surrounded by a dotted line in FIG. 4). Also, the port CA2 eventually access the volume 1 on the storage apparatus A and the volume 3 on the storage apparatus B. Information concerning connecting relation among the apparatuses are collected in advance from the management agents of the respective apparatuses by the management target composing information collection function on the managing computer shown in FIG. 1. The collected information is stored in the management data base and managed, and the bottleneck analyzing function refers to the information when the analysis procedure is executed (602).

Figure 10:
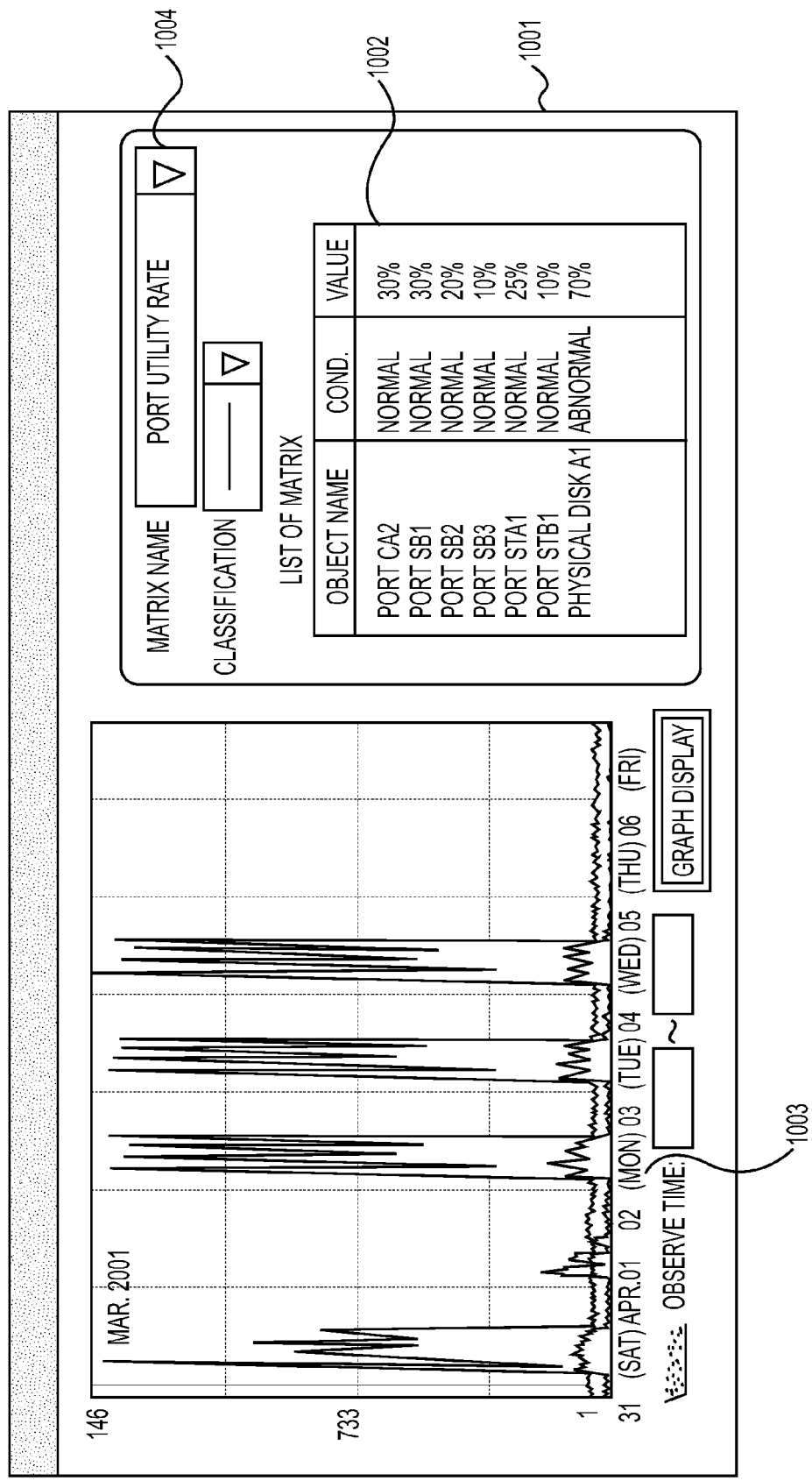
FIG. 10 shows an example of a managing screen image for searching a bottleneck section.

The bottleneck analyzing function refers to the management database, and displays data traffic amounts of the ports listed, and accessing loads to the physical disks within the storage apparatuses in a format shown in FIG. 10, for example, (603) and (604). In the illustrated example shown in FIG. 10, it is understood that there is no problem in the data traffic amount at each port, but accesses are concentrated on the physical disk A1 in the storage apparatus. It is noted that the management target composing information collection function on the managing computer may periodically collect the data traffic amount information and load information from the management agents of the respective apparatuses, and store and manage them on the management database; and the bottleneck analyzing function can refer to them when the analysis procedure is executed.

Figure 5:
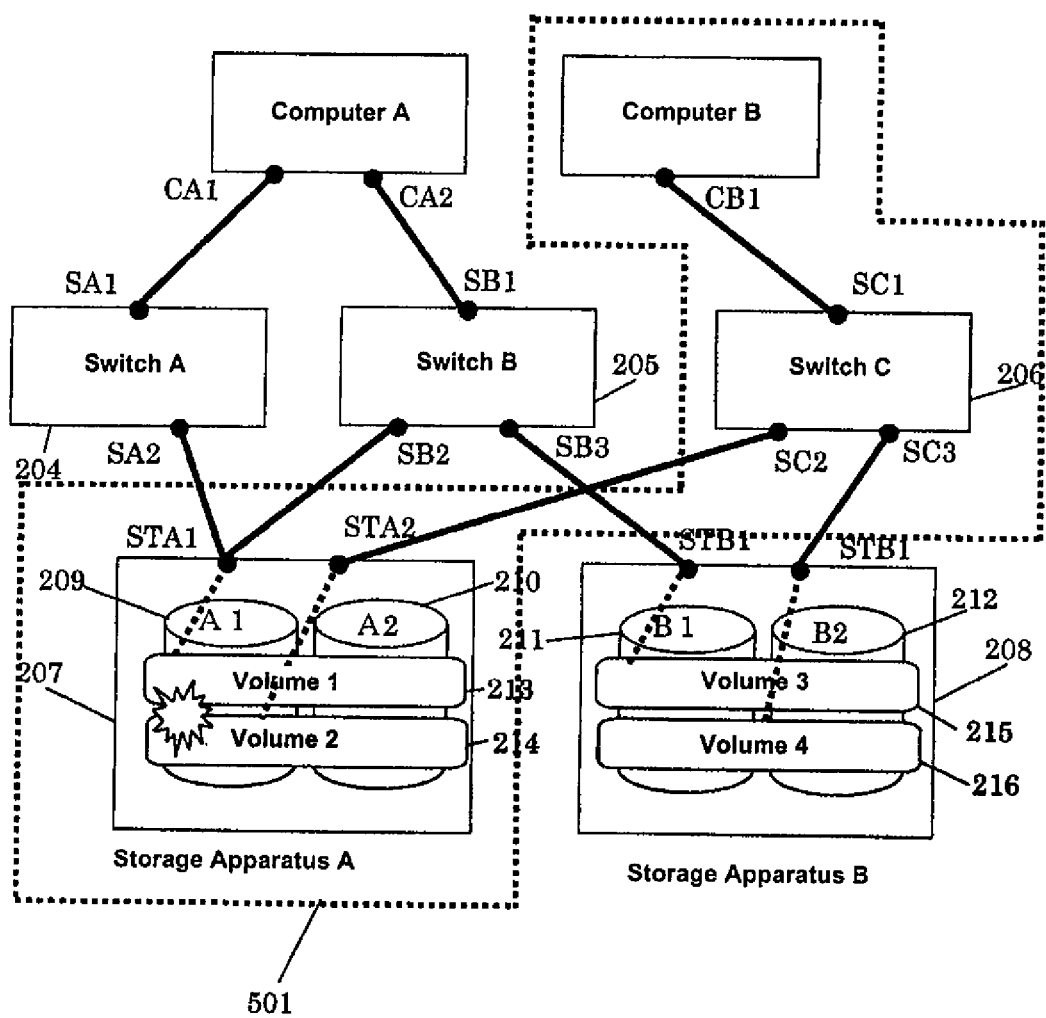
FIG. 5 shows a networking concept of a storage managing system.
Figure 7:
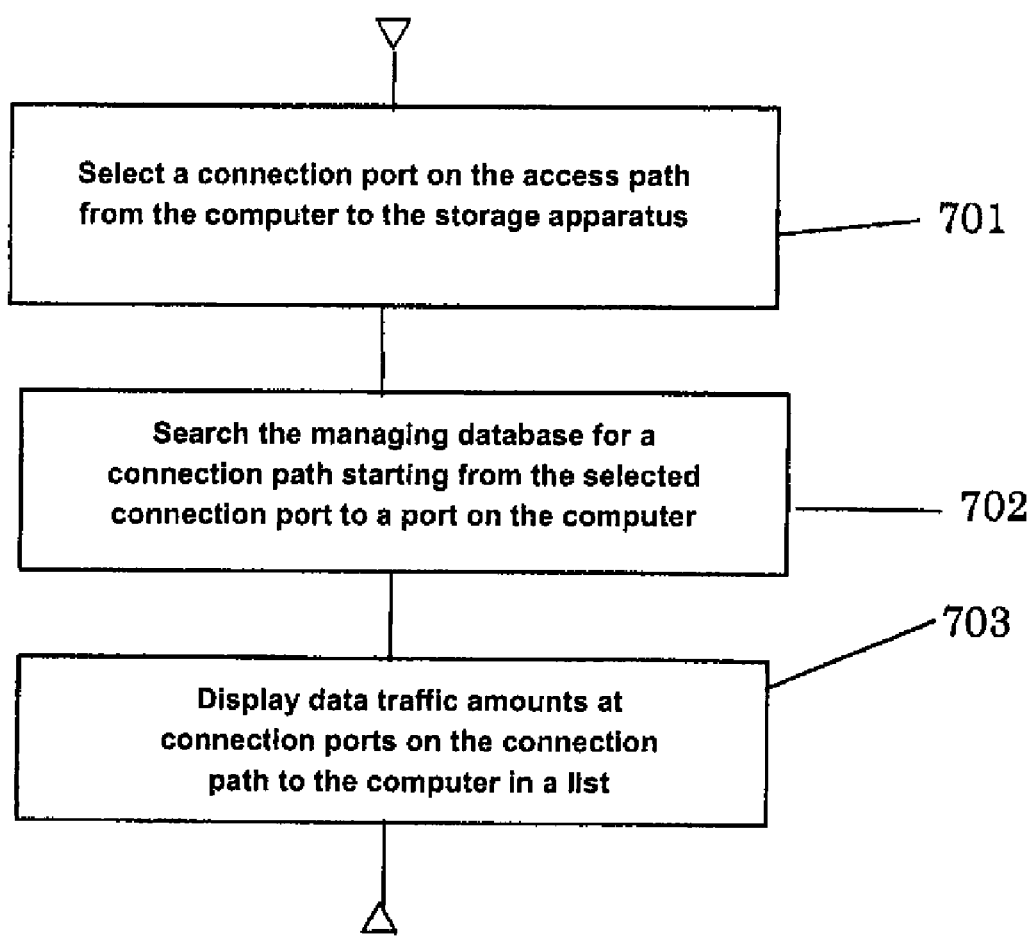
FIG. 7 shows a flowchart of a procedure to search a bottleneck section.

Next, referring to FIGS. 5 and 7, a procedure to search a connection path starting from one of volumes that share the physical disk and leading to a computer that uses these volumes is described.

FIG. 5 shows a state in which the volume 2 is selected as a volume that shares the physical disk A1, and a connection path starting from the access port STA2 to this volume is searched (701) and (702). A port that accesses to the port STA2 is the port SC2 of the switch C, and the port SC2 is accessed from the port CB1 of the computer B through the port SC1 of the switch C (which corresponds to an area surrounded by a dotted line in FIG. 5). In a similar manner to the procedure shown in FIG. 6, the data traffic amount of each of the ports is displayed in a list. An example of the search result is shown in FIG. 10. By this, it is understood that the data traffic from the port CB1 of the computer B is heavy, and this consequently pushes up the access load to the physical disk A1 of the storage apparatus A.

Figure 11:
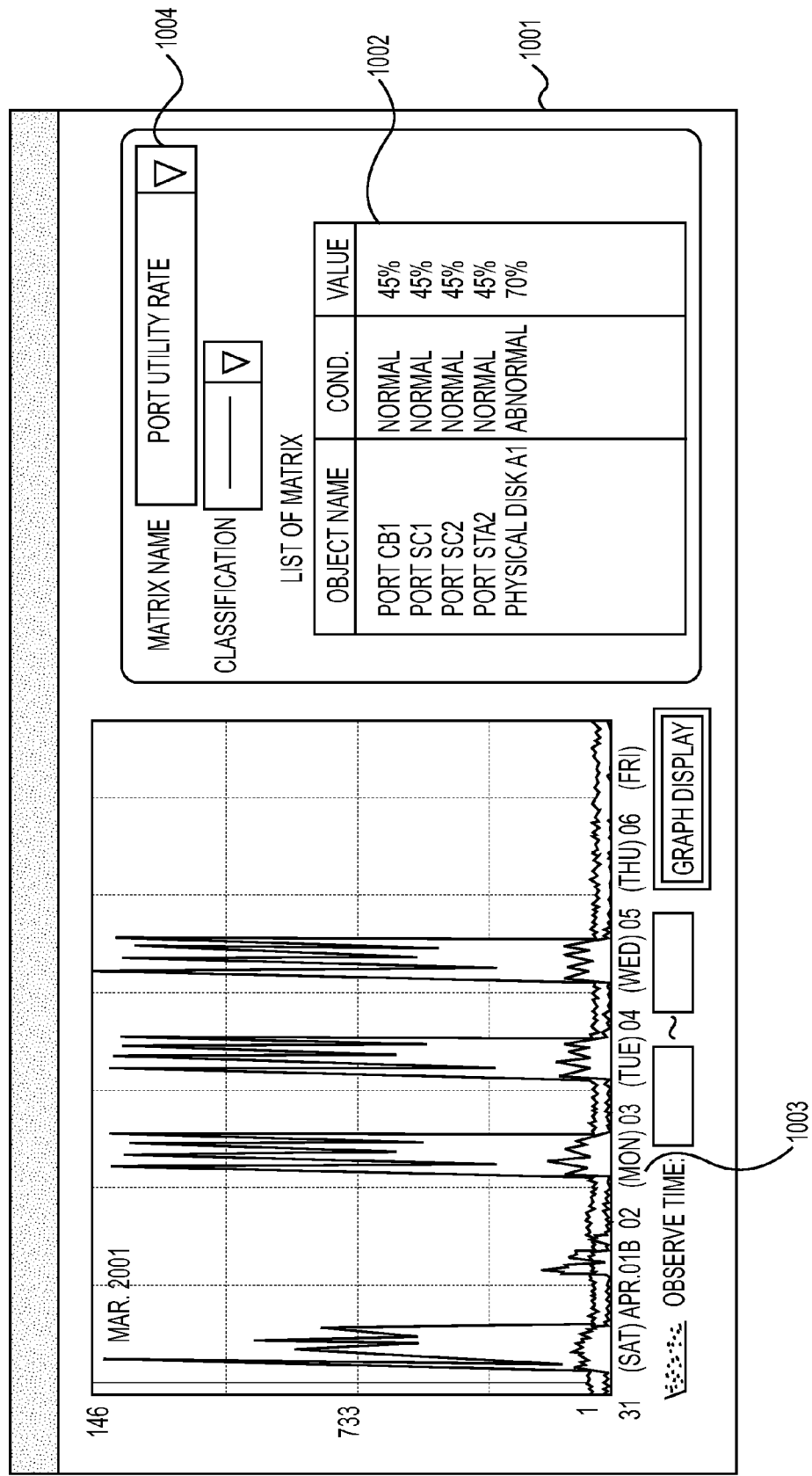
FIG. 11 shows an example of a managing screen image for searching a bottleneck section.

The display monitor screens (1001) displayed by the bottleneck analyzing function in FIGS. 10 and 11 show the data traffics at the respective ports on the connection path in a list (1002), and also show time-wise changes of the data traffics in a graph (1003) together with the information of the multiple ports.

FIGS. 12 (*a*), 12 (*b*) and 12 (*c*) show examples of tables of the management database and their data that are used by the bottleneck analyzing function. FIG. 12 (*a*) shows a table (1201) that manages the composition information about target equipments to be managed, which is used to manage information for apparatuses (nodes) and ports on the apparatuses, and destination ports that are connected. Connection relations among the apparatuses can be created based on this information. FIG. 12 (*b*) shows a table (1202) that manages data traffic amounts of the respective ports. The data traffic amounts may be managed by a variety of methods. For example, the data traffic amounts may be managed with values such as past values, average values for a predetermined period of time, or the like. Or, for example, the data traffic amounts may be managed by successively storing values as is that are periodically collected. The graphs displayed in FIG. 10 and FIG. 11 need the latter data management method. FIG. 12 (*c*) shows a table (1203) that manages relations between ports on the storage apparatuses, physical disks and volumes.

As a method for further tracking down a bottleneck factor in the bottleneck analysis procedure indicated in FIG. 6 and FIG. 7, a method that uses synchronization of a matrix can be applied. By utilizing multiple regression analysis, for example, data traffic at a port that has the highest synchronization with changes of access time from the connection port on the computer to the storage apparatus and access loads to the storage apparatus can be listed up in the order of priority.

By applying the bottleneck analysis procedure described above, necessary information can be checked in a table, as compared to a conventional method in which the data traffic at each of the apparatuses is individually checked by an administrator. Accordingly, problems can be more quickly discovered, and the work load to administrators can be alleviated.

Figure 8:
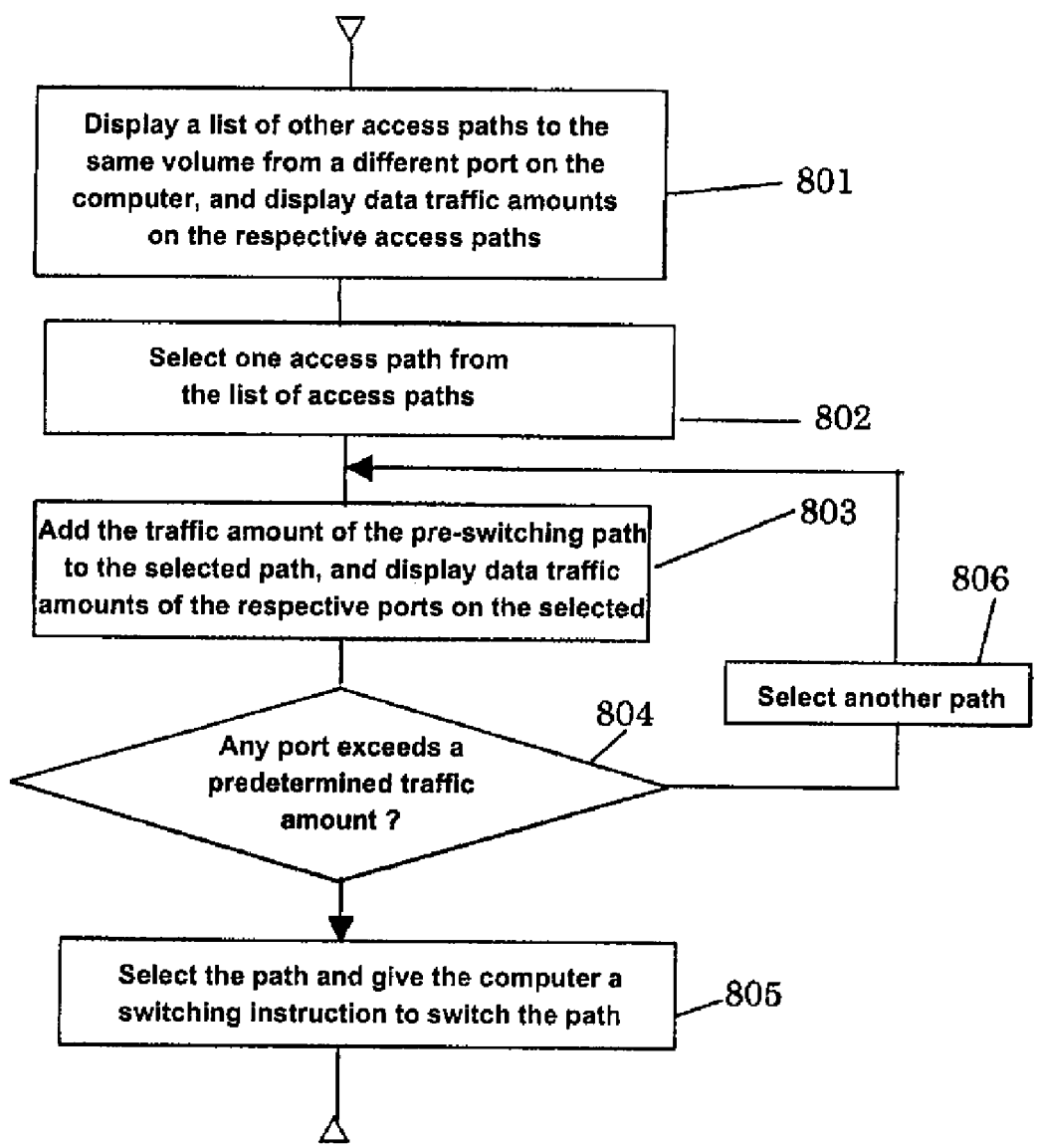
FIG. 8 shows a flowchart of a procedure to switch paths for leveling off the load.
Figure 9:
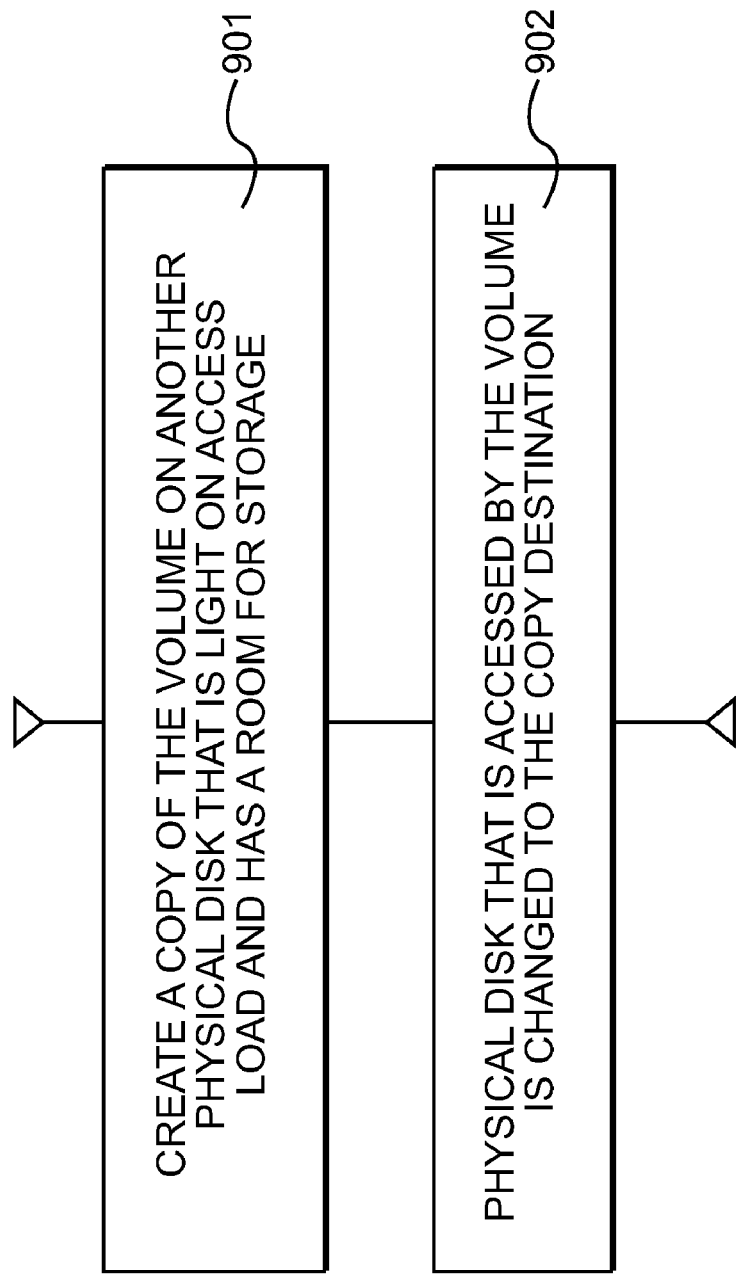
FIG. 9 shows a flowchart of a procedure to switch physical disk volumes for leveling off the load.

Next, an example of a processing procedure of the switching judging function, which is aiming at leveling off the load on the storage system, is described with reference to FIG. 8.

First, when a port on an access path to the storage apparatus is overloaded, the following procedure is performed. The procedure includes displaying a list of the access paths through other switches to the same volume on the storage apparatus from a port on the same computer different from the port whose access time exceeds a predetermined limit, and displaying data traffics on the respective access paths (801).

The administrator refers to the data traffic amounts, and selects one of the access paths from the list of the access paths (802).

The data traffic amount on the access path before switching is added to the one on the selected path, and then data traffic at each of the ports on the access path is displayed (803).

If any of the ports exceeds a predetermined traffic amount, another access path is selected, and the procedure from 803 is repeated. If this does not happen, the access path is selected, and a switching instruction to switch the ports is given through the path switching function of the computer (805). The computer that receives the switching instruction switches the port and can now access to the storage apparatus through an access path corresponding to the switched port. For a zone setting, a switching instruction to a connection apparatus (switches) may be needed.

Next, when the access load to a physical disk on a storage apparatus becomes excessive, the following procedure is performed.

The path switching judging function instructs the storage apparatus through the path switching function a switching that designates an overloaded volume. A copy of the volume is created on another physical disk that is light on access load and has a room for storage (901).

The physical disk on the storage apparatus that is accessed by the volume is changed to the copy destination (902). In this procedure, the switching can be made without changing the access ports to the storage apparatus as viewed externally. For a zone setting, a switching instruction to a connection apparatus (switches) may be needed.

By using the path switching judging function, the administrator can navigate through switching methods according to the bottleneck section, and can readily take an appropriate procedure, which reduces the work load on the administrator.

In accordance with the present invention, a possible bottleneck section can be automatically pointed out based on the structure of the storage system, and therefore the problem can be quickly found. Also, after a bottleneck section is discovered, an appropriate switching procedure can be readily started according to the bottleneck section, such that the operation load on the storage system can be reduced.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A management computer comprising:
    a memory storing:
        (A) toplogical information including identifiers of ports of computers, storage apparatuses, and switches;
    a processor, which is configured to:
        (B) collect a plurality of performance information of the ports, and a plurality of access times from computer ports to the storage apparatuses;
        (C) evaluate that a certain access time, from a first port of a first computer to a first volume on a first storage apparatus exceeds a predetermined limit;
        (D) search at least one second access path starting from a second port of the first computer to the first volume;
        (E) display the at least one second access path along with corresponding data traffic amounts from the second port to the first volume; and
        (F) select one second access path based on the displayed data traffic amounts if the estimated data traffic on the selected second access path does not exceed a predetermined amount.

2. A management computer according to claim 1,
    wherein, for the display of the at least one second access path along with corresponding data traffic amounts from the second port to the first volume, the processor is configured to:
        (E1) display a graph of the searched performance information; and
        (E2) display a value of the searched performance information.

3. The management computer as set forth in claim 1, wherein in the step (F), the data traffic on the selected second access path is estimated by adding data traffic on the first access path to the data traffic on the selected second access path.

4. A computer-readable medium comprising code that when executed causes a management computer to:
    (A) store toplogical information including identifiers of ports of computers, storage apparatuses, and switches;
    (B) collect a plurality of performance information of the ports, and a plurality of access times from computer ports to the storage apparatuses;
    (C) evaluate that a certain access time, from a first port of a first computer to a first volume on a first storage apparatus exceeds a predetermined limit;
    (D) search at least one second access path starting from a second port of the first computer to the first volume;
    (E) display the at least one second access path along with corresponding data traffic amounts from the second port to the first volume; and
    (F) select one second access path based on the displayed data traffic amounts if the estimated data traffic on the selected second access path does not exceed a predetermined amount.

5. A computer readable medium according to claim 4,
    wherein, for the display of the at least one second access path along with corresponding data traffic amounts from the second port to the first volume, the computer-readable medium further comprises code that when executed causes the management computer to:
        (E1) display a graph of the searched performance information; and
        (E2) display a value of the searched performance information.

6. A computer readable medium according to claim 4, wherein in the step (F), the computer-readable medium further comprises code that when executed causes the management computer to estimate the data traffic on the selected second access path by adding data traffic on the first access path to the data traffic on the selected second access path.

7. A system comprising:
    computers;
    storage apparatuses storing data for the computers;

switches coupled to the computers and storage apparatuses; and a management computer configured to:
(A) store toplogical information including identifiers of ports of computers, storage apparatuses, and switches;
(B) collect a plurality of performance information of the ports, and a plurality of access times from computer ports to the storage apparatuses;
(C) evaluate that a certain access time, from a first port of a first computer to a first volume on a first storage apparatus exceeds a predetermined limit;
(D) search at least one second access path starting from a second port of the first computer to the first volume;
(E) display the at least one second access path along with corresponding data traffic amounts from the second port to the first volume; and
(F) select one second access path based on the displayed data traffic amounts if the estimated data traffic on the selected second access path does not exceed a predetermined amount.

8. The system according to claim 7,
wherein, for the display of the at least one second access path along with corresponding data traffic amounts from the second port to the first volume, the management computer is configured to:
(E1) display a graph of the searched performance information; and
(E2) display a value of the searched performance information.

9. The system as set forth in claim 7, wherein in the step (F), the data traffic on the selected second access path is estimated by adding data traffic on the first access path to the data traffic on the selected second access path.

10. A management computer comprising:
a memory storing:
(A) toplogical information including identifiers of ports of computers, storage apparatuses, and switches;
a processor, which is configured to:
(B) identify a first port, on a first computer, having an access time, via a first access path, to a first logical volume in a first storage apparatus that exceeds a predetermined limit;
(C) display a list of second access paths from a different port of the first computer to the first volume and display data traffic amounts for each of the access paths;
(D) select one of the second access paths;
(E) estimate traffic amounts for ports on the selected second access path if the first path is to be switched to the selected second access path and determine if any port on the selected second access path would exceed a predetermined traffic amount; and
(F) if any port on the selected second access path exceeds the predetermined traffic amount, select another one of the second access paths and the selected second access path and repeat steps (E) and (F).

11. A management computer according to claim 10,
wherein, for the display of a list of second access paths from a different port of the first computer to the first volume and display data traffic amounts for each of the access paths, the processor is configured to:
(C1) display a graph of the searched performance information; and
(C2) display a value of the searched performance information.

12. The management computer as set forth in claim 10, wherein the step (E) includes the step of adding a data traffic amount of the first access path to the selected second access path in order to estimate traffic amounts for ports on the selected second access path.

13. A computer-readable medium comprising code that when executed causes a management computer to:
(A) store toplogical information including identifiers of ports of computers, storage apparatuses, and switches;
(B) identify a first port, on a first computer, having an access time, via a first access path, to a first logical volume in a first storage apparatus that exceeds a predetermined limit;
(C) display a list of second access paths from a different port of the first computer to the first volume and display data traffic amounts for each of the access paths;
(D) select one of the second access paths;
(E) estimate traffic amounts for ports on the selected second access path if the first path is to be switched to the selected second access path and determine if any port on the selected second access path would exceed a predetermined traffic amount; and
(F) if any port on the selected second access path exceeds the predetermined traffic amount, select another one of the second access paths and the selected second access path and repeat steps (E) and (F).

14. A computer readable medium according to claim 13,
wherein, for the display of a list of second access paths from a different port of the first computer to the first volume and display data traffic amounts for each of the access paths, the computer-readable medium further comprises code that when executed causes the management computer to:
(C1) display a graph of the searched performance information; and
(C2) display a value of the searched performance information.

15. A computer readable medium according to claim 13, wherein in the step (E), the computer-readable medium comprises further code that when executed causes the management computer to add a data traffic amount of the first access path to the selected second access path in order to estimate traffic amounts for ports on the selected second access path.

16. A system comprising:
computers;
storage apparatuses storing data for the computers;
switches coupled to the computers and storage apparatuses; and
a management computer configured to:
(A) store toplogical information including identifiers of ports of computers, storage apparatuses, and switches;
(B) identify a first port, on a first computer, having an access time, via a first access path, to a first logical volume in a first storage apparatus that exceeds a predetermined limit;
(C) display a list of second access paths from a different port of the first computer to the first volume and display data traffic amounts for each of the access paths;
(D) select one of the second access paths;
(E) estimate traffic amounts for ports on the selected second access path if the first path is to be switched to the selected second access path and determine if any port on the selected second access path would exceed a predetermined traffic amount;

(F) if any port on the selected second access path exceeds the predetermined traffic amount, select another one of the second access paths and the selected second access path and repeat steps (E) and (F).

17. The system according to claim 16,
wherein, for the display of a list of second access paths from a different port of the first computer to the first volume and display data traffic amounts for each of the access paths, the management computer is configured to:

(C1) display a graph of the searched performance information; and
(C2) display a value of the searched performance information.

18. The system as set forth in claim 16, wherein the step (E) includes the step of adding a data traffic amount of the first access path to the selected second access path in order to estimate traffic amounts for ports on the selected second access path.

* * * * *